United States Patent Office 3,165,504
Patented Jan. 12, 1965

3,165,504
CATALYST AND PROCESS FOR PRODUCING
OLEFIN POLYMERS
John P. Hogan, Bartlesville, Okla., assignor to Phillips
Petroleum Company, a corporation of Delaware
No Drawing. Filed Feb. 27, 1961, Ser. No. 91,612
11 Claims. (Cl. 260—94.9)

This invention relates to the catalytic polymerization of olefinic hydrocarbons to higher molecular weight products. In accordance with one aspect, this invention relates to an improved process for producing polymers of 1-olefins. In accordance with another aspect, this invention relates to a novel and improved catalyst to promote the polymerization of 1-olefins.

The production of normally solid polymers of 1-olefins by polymerization of such olefins in the presence of a catalyst comprising chromium oxide associated with at least one member of the group consisting of silica, alumina, zirconia, and thoria wherein at least part of the chromium is hexavalent as described in U.S. Patent 2,825,721 (1958) of Hogan et al. This process produces thermoplastic polymers which can be molded to form objects of any desired shape or configuration, extruded and cold-drawn to form filaments, or fabricated to form film. The present invention relates to a catalyst of the type described in the above-cited Hogan et al. patent having improved activity for the polymerization of 1-olefins.

Accordingly, an object of this invention is to provide an improved catalyst to promote the polymerization of 1-olefins.

Another object of this invention is to provide improved methods for forming olefin polymerization catalysts.

Another object of this invention is to increase the polymerization activity and polymer productivity of a polymerization catalyst.

Still another object of this invention is to provide an improved process for the production of solid 1-olefin polymers, especially polymers of ethylene.

Other objects, aspects as well as the several advantages of this invention will be apparent to those skilled in the art on a further study of the specification and the appended claims.

In accordance with the present invention, an improved supported chromium oxide polymerization catalyst is provided by heating at least the support component of said catalyst together with zirconium fluoride at an elevated temperature to increase the polymerizing activity. Although zirconium fluoride is preferred, other metal fluorides can be used including such metals as iron, cobalt, silver, strontium, calcium, zinc, tin, bismuth, and the like. The support employed can comprise one or more members of the group consisting of silica, alumina, zirconia, and thoria and includes silica-alumina, silica-alumina-zirconia, silica-zirconia, acid treated clays and similar complexes or composites known in the art as catalyst components. This class of materials is referred to herein as a "support" for purposes of convenience. This term does not necessarily require that these materials be catalytically inert.

Also, in accordance with the present invention, 1-olefins, especially ethylene, can be polymerized to obtain increased yields of polymer by the use of a catalyst prepared in accordance with this invention as described hereinbefore. The polymerization includes ethylene homopolymerization and copolymerization of ethylene with at least one olefin having a higher molecular weight, especially aliphatic olefins having from 3 to 12 carbon atoms per molecule and no branching nearer the double bond than the 4-position, for example, propylene, 1-butene, 2-butene, 1-pentene, 1-hexene, 4-methyl-1-pentene, 1-octene, 1-dodecene, and the like. Frequently, the higher olefin is utilized in minor amounts as compared with ethylene and usually does not exceed about 25 weight percent of the total comonomeric feed mixture.

As set forth more fully in the above-cited Hogan et al. patent, a valuable polymerization catalyst can be prepared by depositing chromium oxide (e.g., $CrO_3$), or a chromium compound calcinable to chromium oxide (e.g., chromic nitrate, chromic sulfate, ammonium chromate, or chromium carbonate) on a support, for example, silica-alumina, and activating by heating at an elevated temperature to leave at least part of the chromium, preferably at least 0.1 weight percent based on total catalyst weight, in hexavalent form. This type of activation procedure is frequently conducted by heating the dried chromium oxide-silica-alumina composite at a temperature of approximately 450 to 1500° for a time generally ranging from 5 minutes to 20 hours or longer, preferably from 30 minutes to about 10 hours, in such an atmosphere that the chromium oxide is at least partially in the hexavalent state at the termination of the heating. It is ordinarily preferred that the heating be conducted in the presence of an oxygen-containing gas such as air. However, the atmosphere can be nitrogen or other inert gas. Alternatively, the heating can be effected in a vacuum. Reducing gases can be present provided that they are present in such amount that not all of the hexavalent chromium is reduced and some remains in the final catalyst. It is preferred that reducing gases be absent. The total chromium content of the catalyst is generally in the range of 0.5 to 30 weight percent, preferably in the range of 1 to 6 weight percent, but can be outside the broad range, if desired.

In accordance with the present invention, an improved catalyst is obtained when, in conjunction with the afore-described process steps, the silica-alumina, or other support component, is mixed with at least one of the metal fluorides, defined above, and heated at an elevated temperature. The metal fluoride can be added before, after, or simultaneously with the addition of the chromium compound and can be added as an aqueous solution or by "dry mixing."

In accordance with one preparation procedure of this invention, the catalyst can be prepared by heating the support, for example, silica-alumina, in the absence of chromium oxide and in the presence of at least one of the metal fluorides at an elevated temperature, depositing chromium oxide on the resulting composite and heating to achieve final activation.

Alternatively, the catalyst can be prepared by depositing chromium oxide or a chromium compound calcinable thereto on the support, for example, silica-alumina, drying (when water is present), and heating the resulting chromium oxide-containing composite at an elevated temperature in the presence of at least one of the metal fluorides.

As another catalyst preparation procedure in accordance with this invention, one can coimpregnate silica-alumina (or other support) with a solution of one of the metal fluorides and chromium oxide (or a chromium compound calcinable to chromium oxide) and heat the resulting composite at an elevated temperature to impart the desired amount of polymerization activity thereto.

The heating, in accordance with this invention, of the support of chromium oxide-containing composite in the presence of at least one of the defined metal fluorides should occur at a temperature preferably not exceeding 1500° F. unless the time of exposure to such temperature is extremely short, for example, one minute or less. Preferably, the temperature should be within the range of 750° to 1400° F. Heating is ordinarily conducted for a period of time in the range of 5 minutes to 20 hours or longer and preferably in the range of 30 minutes to 10 hours.

The amount of the desired metal fluoride incorporated or added to the catalyst in accordance with this invention is generally within the range of 0.1 to 8 weight percent based on total catalyst weight. These figures represent the metal fluoride on an anhydrous basis, i.e., the amount of metal fluoride added is sufficient to give the catalyst, prior to heating, a metal fluoride content in the range of 0.1 to 8 weight percent. Preferably, the amount of added metal fluoride is in the range of 0.5 to 7 weight percent. Amounts of metal fluoride outside the stated ranges can be added. However, amounts below 0.1 weight percent produce less effect than could otherwise be realized, and amounts greater than 8 weight percent do not produce sufficient additional activation to justify the added consumption of metal fluoride.

The polymerization or copolymerization in accordance with this invention can be conducted in accordance with the techniques which are well known to those skilled in this art. The olefin monomeric feed will consist of ethylene as the sole monomer when an ethylene homopolymer is desired. When a copolymer of ethylene is desired, the monomeric feed generally contains a major proportion of ethylene and a minor proportion of a mono- or diolefin having a higher molecular weight, such as, for example, propylene, 1-butene, 1-pentene, 1-hexene, 4-methyl-1-pentene, 1,3-butadiene, isoprene, and the like. In many cases, the higher olefin is present in amounts less than about 25 weight percent based on total olefin feed.

The reaction can be conducted in the gaseous phase, the liquid phase, or a mixed gas-liquid phase. Frequently, it is desirable to have present a diluent, since the thermal effects of the polymerization reaction are readily controllable in the presence of a liquid diluent. The diluent can be any hydrocarbon which is chemically inert and nondeleterious to the catalyst under the reaction conditions. Generally, the diluent is selected from the group consisting of paraffins and cycloparaffins having from 3 to 12 carbon atoms per molecule.

Suitable diluents include propane, isobutane, normal butane, isopentane, normal pentane, the isohexanes, normal hexane, the isooctanes, the dodecanes, cyclopentane, methylcyclopentane, cyclohexane, methylcyclohexane, the dimethylcyclohexanes, and the like. Aromatic hydrocarbons having from 6 to 12 carbon atoms per molecule can be used. However, these hydrocarbons, or impurities which normally accompany them, appear to deactivate the catalyst somewhat and consequently are frequently not preferred. However, it is entirely within the scope of the invention to utilize such aromatic hydrocarbons as benzene, toluene, the xylenes, ethylbenzene, and the like. The diluent, when used, is generally present in sufficient amounts so that the olefin concentration of the total hydrocarbon feed is of the order of 0.5 to 10 weight percent, though these limits are not absolute.

The temperature to be employed in carrying out the polymerization reactions of this invention can vary over a broad range, but normally ranges from about 100 to about 500° F. However, more frequently, the temperature is in the range of 150 to 350° F.

The pressure employed in carrying out the polymerization reaction is preferably high enough to maintain the diluent, when a liquid diluent is used, in the liquid phase and to assure that olefins not liquefied under these conditions are dissolved in the liquid phase in sufficient amount. Pressures of the order of about 50 to about 700 lbs. per square inch are generally adequate for this purpose. In general, the reaction pressure can vary from approximately atmospheric to as high as several thousand pounds per square inch. The residence or reaction time can range from a few minutes to several hours and is generally in the range 15 minutes to about 3 hours.

The catalyst contacting technique can be any of those well known in the catalyst arts. Thus, the reaction can be conducted by contacting the hydrocarbon feed with a fixed bed of catalyst, with a gravitating bed of catalyst, with a catalyst suspended in finely divided particulate form in the diluent and being maintained in suspension by agitation, or by the use of the fluidized-bed technique.

When the reaction is conducted at temperatures of approximately 225° F. and below, so that the polymer or copolymer which forms is in the form of a solid granular suspension in the reaction mixture, the polymer can be recovered by withdrawing reaction mixture from the reactor, removing supernatant liquid by decantation, filtration and/or vaporization and recovering the polymer thus freed from diluent. When the reaction is conducted at temperatures above about 225° F., the polymer is at least partially in solution in the diluent. Under these conditions, the reaction mixture can be withdrawn from the reactor, unreacted olefin removed, for example, by flashing, the catalyst removed by filtration or centrifugation, and the polymer recovered from solution in the diluent by cooling to precipitate the polymer and subsequently filtering or by vaporizing the diluent. Other reaction techniques and recovery methods known to those skilled in this art are applicable in the practice of the present invention.

The following specific example presents a preferred embodiment of this invention. It should be evident that this example is presented as an illustration of the invention rather than a limitation thereof.

EXAMPLE

A run was carried out in which a chromium oxide catalyst treated with zirconium fluoride was employed for the polymerization of ethylene.

A catalyst was prepared by impregnating a silica-alumina gel containing approximately 90 weight percent silica and 10 weight percent alumina with an aqueous solution of chromium trioxide. After partially drying the catalyst at 300° F., 5 weight percent, based on the catalyst, of $ZrF_4$ was dry mixed with the impregnated support. The resulting composite was then activated at 1000° F. for 5 hours with dry air (dew point below −60° F.). A control run was made in which a catalyst was prepared in exactly the same manner except that no $ZrF_4$ was added. In both runs, the Cr content of the final catalyst was 1.25 weight percent.

Ethylene was then contacted with a suspension of each catalyst in normal pentane at 210° F. and a pressure of 450 p.s.i.g. The duration of each run was 1.5 hours. The reaction was conducted in a closed reactor provided with a mechanical stirrer. The amount of catalyst used in each run was approximately 0.1 weight percent, based on pentane, and the polymer was recovered by withdrawing the contents of the reactor and vaporizing the normal pentane. The results of these runs are expressed below as Table I.

*Table I*

| Wt. percent $ZrF_4$ added to catalyst | Wt. percent Cr. in Catalyst | Productivity, # Polymer/# Catalyst |
|---|---|---|
| 5.0 | 1.25 | 1,800 |
| 0.0 | 1.25 | 1,310 |

It can be seen that the addition of one of the metal fluorides causes a substantial increase in productivity.

As will be evident to those skilled in the art, many variations and modifications of this invention can be practiced in view of the foregoing disclosure. Such variations and modifications are clearly believed to come within the spirit and scope of the invention.

I claim:

1. A polymerization process which comprises polymerizing monomers selected from the group consisting of ethylene and mixtures of ethylene with higher molecular weight 1-olefins having from 3 to 12 carbon atoms per molecule at a temperature in the range 100–500° F. in the presence of catalyst comprising chromium oxide supported on at least one member of the group consisting of silica, alumina, zirconia and thoria, wherein at least part of the chromium is hexavalent, said catalyst having been improved in activity by incorporating a metal fluoride of a metal selected from the group consisting of zirconium, iron, cobalt, silver, strontium, calcium, zinc, tin and bismuth therein and then heating at a temperature ranging from 450–1500° F. for a period of time ranging from 5 minutes to 20 hours sufficient to increase the activity of said catalyst in polymerizing said olefin.

2. A polymerization process which comprises polymerizing ethylene to a normally solid polymer at a temperature in the range from 100 to 500° F. by contacting ethylene with a catalyst comprising chromium oxide supported on at least one member of the group consisting of silica, alumina, zirconia and thoria, and wherein at least part of the chromium is hexavalent, said catalyst having been improved in activity by heating same at a temperature in the range of 750–1400° F. for from about 30 minutes to 10 hours in the presence of zirconium fluoride prior to use in said polymerization.

3. A process for the preparation of a polymer of ethylene which comprises contacting ethylene at a temperature in the range 150 to 350° F. with an activated catalyst comprising a supported chromium oxide catalyst wherein at least part of the chromium is hexavalent, and recovering polymer thus produced, said catalyst before polymerization having been improved in activity by incorporating therein zirconium fluoride in an amount ranging from 0.1 to 8 weight percent based on total catalyst weight and heating at a temperature in the range of 750–1400° F. for a period of time ranging from 5 minutes to 20 hours sufficient to increase the activity of said catalyst for polymerizing ethylene.

4. A polymerization process which comprises polymerizing ethylene to a solid polymer at a temperature in the range of 150 to 350° F. in the presence of a catalyst prepared by depositing a metal fluoride of a metal selected from the group consisting of zirconium, iron, cobalt, silver, strontium, calcium, zinc, tin and bismuth and at least one compound selected from the group consisting of chromium oxide and chromium compounds calcinable to chromium oxide by impregnating at least one member of the group consisting of silica, alumina, zirconia and thoria, heating the resulting mixture in the range of 750 to 1400° F. for a period of time in the range of 5 minutes to 20 hours, thus leaving at least part of the chromium in hexavalent state, and recovering a solid polymer of ethylene.

5. In a catalytic process for polymerizing ethylene and mixtures of ethylene with higher molecular weight 1-olefins having from 3 to 12 carbon atoms per molecule to normally solid polymers using as the polymerization catalyst a supported chromium oxide catalyst wherein at least part of the chromium is in the hexavalent state, the improvement comprising pretreating said catalyst by heating at a temperature ranging from 450–1500° F. in the presence of a metal fluoride of a metal selected from the group consisting of zirconium, iron, cobalt, silver, strontium, calcium, zinc, tin and bismuth for a period of time sufficient to increase the activity of said catalyst in polymerizing said olefin.

6. In a process for preparing a catalyst comprising chromium oxide on at least one member of the group consisting of silica, alumina, zirconia and thoria as a support, at least part of the chromium in the finished catalyst being hexavalent, and activating by heating at an elevated temperature ranging from 450–1400° F. for 5 minutes to 20 hours, the improvement which comprises incorporating zirconium fluoride in an amount ranging from 0.1 to 8 weight percent based on total catalyst weight into said catalyst before activation to increase the polymerization activity of said catalyst.

7. A catalyst preparation process which comprises impregnating at least one member of the group consisting of silica, alumina, zirconia and thoria as a support, with a compound selected from the group consisting of chromium oxide and compounds of chromium calcinable to chromium oxide, also impregnating said support with a metal fluoride selected from the group consisting of zirconium, iron, cobalt, silver, strontium, calcium, zinc, tin, and bismuth, drying the resulting mixture, and heating the resulting composite at a temperature in the range of 450 to 1400° F. for a period of time in the range of 5 minutes to 20 hours, at least part of the chromium in the catalyst thus produced being hexavalent.

8. A process which comprises adding to a chromium oxide catalyst supported on at least one member of the group consisting of silica, alumina, zirconia, thoria and acid treated clays and zirconium fluoride and heating the resulting mixture at a temperature in the range of 750 to 1400° F. for a time in the range of 5 minutes to 20 hours, the resulting catalyst containing at least part of its chromium in the hexavalent state.

9. A catalyst preparation process which comprises admixing, with a silica-alumina support, zirconium fluoride and at least one compound selected from the group consisting of chromium oxide and chromium compounds calcinable to chromium oxide, and having the resulting mixture at a temperature in the range of 750° to 1400° F. for a period of time in the range of 5 minutes to 20 hours, and leaving at least part of the chromium in the hexavalent state.

10. A catalyst preparation process which comprises dry mixing zirconium fluoride with a chromium oxide-silica-alumina catalyst, and heating the resulting mixture at a temperature in the range of 750 to 1400° F. for a time in the range of 5 minutes to 20 hours to activate said catalyst and leave at least part of the chromium in the hexavalent state.

11. A catalyst produced according to claim 6.

References Cited in the file of this patent
UNITED STATES PATENTS 2,825,721  Hogan et al. _____ Mar. 4, 1958
2,878,241  Schneider _____ Mar. 17, 1959